Patented May 5, 1936

2,039,305

UNITED STATES PATENT OFFICE 2,039,305

MANUFACTURE OF ACIDYLATED AROMATIC AMINES

Henry Dreyfus, London, England

No Drawing. Original application July 22, 1931, Serial No. 552,421. Divided and this application February 18, 1932, Serial No. 593,861. In Great Britain August 15, 1930

15 Claims. (Cl. 260—124)

This invention is a divisional application of U. S. application S. No. 552,421 filed 22nd July, 1931, and relates to improvements in the manufacture of organic compounds and in particular of organic compounds which have a high melting point and/or which are insoluble in aqueous liquids and/or in the common organic solvents and which are particularly suitable for incorporation in products comprising derivatives of cellulose with a view of reducing the lustre of said products.

I have found, and this constitutes the basis of the present invention, that dibenzoyl benzidine and other aromatic acidyl derivatives of diamino diphenyl bases may be prepared in a very pure state by treating benzidine or other diamino diphenyl base (i. e. a base containing two amino groups and two benzene residues) with benzoic anhydride or other appropriate aromatic acid anhydride. So far as I am aware these compounds have never been prepared by this method before.

After formation of the desired di-aromatic acidyl derivative the reaction mixture may be treated with caustic soda or other base in order to separate any acid which has been formed or to convert excess benzoic or other anhydride into a soluble form and thereby facilitate its separation.

In order to obtain the said organic compounds in as fine a state of subdivision as possible the base, for example benzidine, from which they are to be prepared, may be dissolved, suspended or dispersed in a suitable liquid, for example water, benzene, toluene, xylene, ether, acetic acid or acetone, so as to form only a dilute solution, suspension or dispersion, and the benzidine or other base treated thereafter with the aromatic acid anhydride to form the final compound. Further it is preferable to effect the reaction at under boiling temperature of the reaction medium, for example at a temperature of the order of 80° C. in the case of an aqueous medium, as the boiling apparently affects the fineness of the particles obtained.

The acidylation may be effected in presence of a suitable wetting agent or the formed product may be treated with a wetting agent. As examples of suitable wetting agents may be mentioned sulphonated and preferably highly sulphonated aliphatic hydrocarbons, acids or alcohols, sulphonated naphthalene compounds, e. g. naphthalene-formaldehyde sulphonic acid or alkylated naphthalene sulphonic acids, and the sulphonated amides of higher fatty acids, for instance the sulphonated ethylene diamide of oleic acid.

The dibenzoyl benzidine or other di-aromatic acidylated aromatic di-amino base may after separation from the medium in which it has been prepared be ground either wet or dry, if desired, so as still further to reduce the particle size, and/or it may be worked directly with the solvent to be used for making up the spinning solution, for instance acetone, or with the whole or a part of the spinning solution itself. For example dibenzoyl benzidine obtained in an aqueous medium may be rubbed up with acetone with or without previous grinding, and the paste thereafter incorporated in the spinning solution of cellulose acetate in acetone.

For the preparation of the diacidyl aromatic diamino bases in as pure and white a state as possible it is obviously desirable to employ comparatively pure starting materials, and for this purpose the benzidine or other base may be purified before acidylation in any desired way. The commercial product is very often somewhat coloured and may be suitably decolourized by boiling a solution thereof with animal charcoal, active carbon, silica gel, or other suitable decolourizing agent. After boiling the solution may if desired be filtered through a cake of suitable decolourizing agent, and the whole process may be repeated as many times as is desirable. A further method of purification consists in simple distillation.

The following example illustrates the invention but is not to be considered as limiting it in any way:—

Example

Commercial benzidine is purified either by two successive distillations or by the following method. 200 parts by weight of crude benzidine are dissolved in 2000 parts by weight of methylated spirit, 50 parts of sodium sulphite and 50 parts by weight of an activated charcoal, for example of the type sold under the trade name Norit XXX.EF, added and the whole refluxed for half an hour. A paste is made up of the Norit active carbon with methylated spirit and formed into a smooth cake on a suitable filter and washed with methylated spirit. The solution of the benzidine is filtered through the active carbon cake and the cake finally washed with warm methylated spirit.

50 parts of the purified benzidine are converted into an aqueous paste and are suspended in 1000 to 2000 parts of water. 130 to 135 parts of finely ground benzoic anhydride are stirred in slowly to the cold suspension at a temperature of 20 to 30° C. during 2 to 3 hours. The whole is then gradually heated up with stirring to 90° C. for a further period of 3 hours until the benzoylation is complete. This may be ascertained for example by testing a portion of the reaction mixture with nitrous acid and R salt (salt of β-naphthol-3:6-di-sulphonic acid), the reaction being complete when no red colouration is produced. The hot liquors are then made slightly alkaline with caustic soda, filtered, and the dibenzoyl benzidine thoroughly washed with hot water. The aqueous paste with or without drying may be treated with acetone, the acetone paste thoroughly milled and the whole incorporated in the spinning solution.

What I claim and desire to secure by Letters Patent is:—

1. Process for the manufacture of acidyl derivatives of diamino diphenyl bases, comprising acidylating the said bases with an aromatic acid anhydride.

2. Process according to claim 1, wherein the acidylation is effected in solution, suspension or dispersion in a liquid medium.

3. Process according to claim 1, wherein the acidylation is effected in an aqueous medium.

4. Process for the manufacture of acidyl derivatives of diamino-diphenyl bases, comprising acidylating the said bases with an aromatic acid anhydride, such acidylation being carried out in a large excess of a liquid medium.

5. Process for the manufacture of acidyl derivatives of diamino-diphenyl bases, comprising acidylating the said bases with an aromatic acid anhydride, such acidylating being carried out in a large excess of aqueous medium.

6. Process for the manufacture of acidyl derivatives of diamino-diphenyl bases comprising acidylating the said bases with an aromatic acid anhydride, such acidylation being carried out in a liquid medium at a temperature below the boiling point of the medium.

7. Process for the manufacture of acidyl derivatives of diamino-diphenyl bases, comprising acidylating the said bases with an aromatic acid anhydride, such acidylation being carried out in an aqueous medium at a temperature of 80–90° C.

8. Process for the manufacture of acidyl derivatives of diamino-diphenyl bases, comprising acidylating the said bases with an aromatic acid anhydride and treating the products with a basic substance to remove any excess reagent and by-products.

9. Process for the manufacture of acidyl derivatives of diamino-diphenyl bases, comprising acidylating the said bases with an aromatic acid anhydride, such acidylation being carried out in an aqueous medium, and thereafter treating with a basic substance to remove any excess reagent and by-products.

10. Process for the manufacture of acidyl derivatives of benzidine, comprising acidylating benzidine with an aromatic acid anhydride in a large excess of a liquid medium.

11. Process for the manufacture of acidyl derivatives of tolidine, comprising acidylating tolidine with an aromatic acid anhydride in a large excess of a liquid medium.

12. Process for the manufacture of acidyl derivatives of benzidine, comprising purifying benzidine, and thereafter acidylating the benzidine with an aromatic acid anhydride.

13. Process for the manufacture of dibenzoyl benzidine, comprising acidylating benzidine with benzoic anhydride.

14. Process for the manufacture of dibenzoyl benzidine, comprising acidylating benzidine with benzoic anhydride in an aqueous medium.

15. Process for the manufacture of dibenzoyl benzidine, comprising acidylating benzidine with benzoic anhydride, such acidylation being carried out at a temperature of 80–90° C. while the materials are in suspension in an aqueous medium, and thereafter treating the materials with a basic substance to remove excess reagent and by-products.

HENRY DREYFUS.